Figure 6:
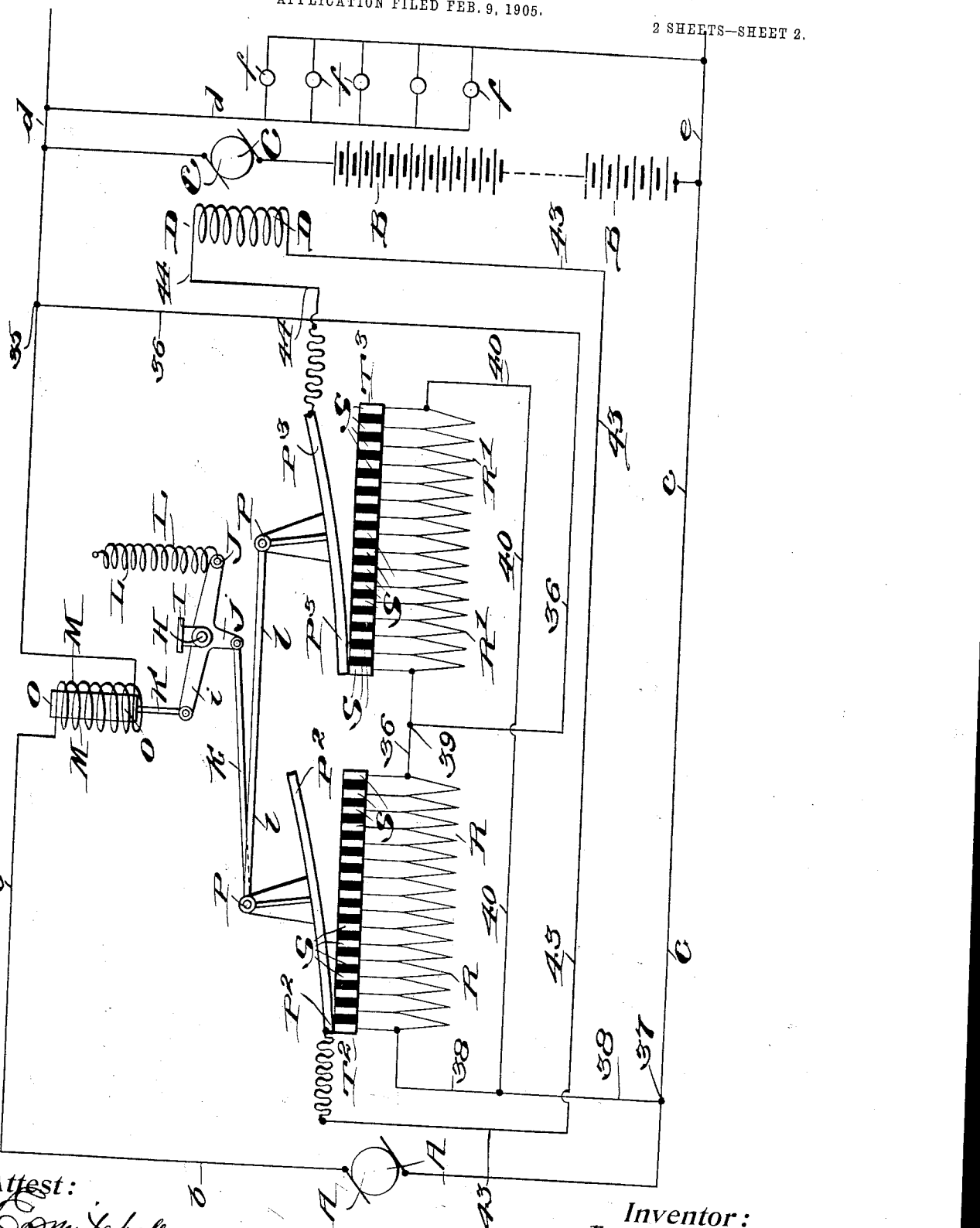

No. 841,106. PATENTED JAN. 15, 1907.
J. BIJUR.
ELECTRIC REGULATOR.
APPLICATION FILED FEB. 9, 1905.
2 SHEETS—SHEET 1.
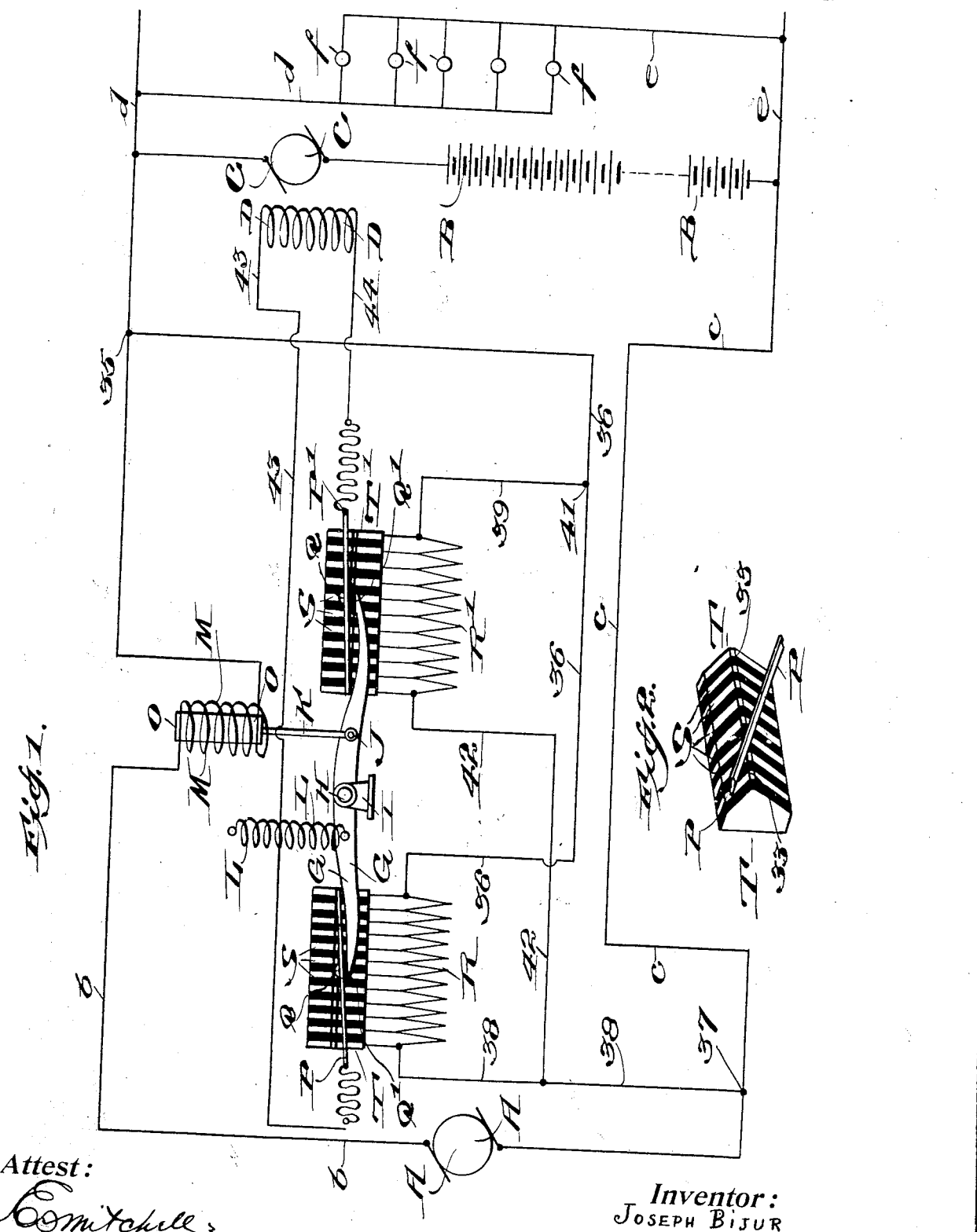
Attest:
Inventor:
JOSEPH BIJUR
by Dickerson, Brown, Raegener & Binney
Attys.

No. 841,106. PATENTED JAN. 15, 1907.
J. BIJUR.
ELECTRIC REGULATOR.
APPLICATION FILED FEB. 9, 1905.

2 SHEETS—SHEET 2.

Attest:
E. S. Mitchell,
R. W. Ashley.

Inventor:
JOSEPH BIJUR
by Dickerson, Brown, Raegener & Binney
Attys.

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

ELECTRIC REGULATOR.

No. 841,106.

Specification of Letters Patent.

Patented Jan. 15, 1907.

Application filed February 9, 1905. Serial No. 244,898.

*To all whom it may concern:*

Be it known that I, JOSEPH BIJUR, a citizen of the United States, and a resident of the borough of Manhattan, city, county, and State of New York, have invented certain new and useful Improvements in Electric Regulators, of which the following is a specification accompanied by drawings.

This invention relates to electric regulators and systems of regulation; and the objects of the invention are to improve upon the construction and operation of such regulators and obtain a large range of movement in the contact-controlling devices by means of a relatively small movement of an electroresponsive device, whereby regulation of the circuits may be more quickly and effectively produced than heretofore and the efficiency, sensitiveness, and certainty of operation of a system of electric regulation correspondingly increased.

To these ends the invention consists of a regulator and system of regulation for carrying out the above objects embodying the features of construction, combinations of elements, and arrangement of circuits, connections, and parts having the general mode of operation substantially as hereinafter fully described and claimed in this specification and shown in the accompanying drawings, in which—

Figure 1 is a diagrammatic representation, partly in elevation, of apparatus and circuits embodying the invention. Fig. 2 is a detail perspective view of a portion of Fig. 1. Fig. 3 is a diagrammatic representation, partly in elevation, of another form of the invention.

The invention is shown in connection with a system of electric distribution in which storage batteries are used in addition to the generating-dynamo, and an auxiliary dynamo is provided to cause the battery to charge or discharge as the external load decreases or increases. The voltage of the auxiliary dynamo is made to vary in direction and amount, or both, as the voltage requirements of the system may necessitate. The object of such a system is to maintain a substantially constant load on the generating-dynamo, with a fluctuating external load, and my improved regulator is especially efficient in attaining the desired object, although, of course, the regulator may be used with any system or in any connection in which it may be found applicable.

Referring to all of the sheets of drawings, A represents a suitable dynamo or source of supply connected to the mains $b$ and $c$, while the work portion of the system carrying the external load is represented by the conductors $d$ and $e$. In this instance the load is represented by the lamps $f$ by way of illustration. Connected across the mains is shown a storage battery B, in series with which is arranged the armature of the auxiliary dynamo C, the field D of which is connected so as to be varied both in direction and amount by the electromagnetic controller which controls the resistances R and R', connected in circuit with the field-winding D of dynamo C. The electric controller is so connected as to be responsive to changes in the external load of lamps $f$ or other electroreceptive devices.

In each of the figures two resistances R and R' are shown by way of illustration, in this instance connected in sections, as shown, to the individual segments S of the series of insulated segments T and T'. The resistances R and R' are controlled by a contact moving along the contact-segments, and thus including more or less of the resistances in circuit. Definite points of contact between the contact-segments and the conducting-arms P and P' are made to travel along the series of segments, and the construction and operation of the apparatus is such that one resistance is included in the circuit as the other is cut out, and vice versa.

In all of the drawings the electric regulator is controlled by a suitable electroresponsive device, shown in this instance as an electromagnet M included in the main line. The regulator made in accordance with this invention is constructed to multiply motion, so that a very slight movement of the magnet-core O will produce a very much greater movement of the portions of the regulator which control the resistances R and R'. The sensitiveness of the apparatus is thus very greatly increased, and a substantially constant load on the generating-dynamo with a fluctuating external load is more readily obtained than heretofore, because a prompt response is given by the regulator when the load first begins to change In Fig. 1 suitable devices are shown operatively connecting the core O of magnet M with the arms P and P' for carrying out the operation described. In this instance a suitable lever G is pivoted at H to a support I and also pivotally connected at J to a rod K, connected to the core O. A retracting-spring L is shown connected to the lever G to oppose the attractive action of the magnet M. The arms P and P' are suitably connected to the lever G, as by means of the screws Q and insulated from said levers by insulation Q'. As the core O moves up and down in accordance with the energization of magnet M it will be seen that one arm will be raised as the other is lowered. The series of segments T and T' in this instance are shown angular in form. In the construction of the apparatus the points or edges 33 of the triangular portions of the segments S are presented to the edges of the arms P and P', as illustrated in front view elevation in Fig. 1 and in perspective view in Fig. 2. The arms P P', as shown, move opposite the segments S, and since they are placed at an angle relatively to the line of the segments it will be seen that a definite point of contact is formed between the segments and arms, which varies in accordance with the energization of the magnet M.

In the operation of the regulator any change in the load on the generator A will result in a change in the magnetization of the magnet M, which varies the resistance and produces a corresponding change in the voltage of the auxiliary dynamo C. When the load on the external circuit exceeds the normal, an excitation is given to the field D of dynamo C, which causes the dynamo to generate an electromotive force that adds itself to the electromotive force of the battery, causing the battery to discharge and assist the generator. Conversely, when the external load falls below the normal an electromotive force is produced in the auxiliary dynamo C in an opposite direction, which assists the generator voltage to send current into the battery. In order that the required variations of current may be produced in the field D, any suitable electrical connections may be provided, as shown, the resistance R is connected across the line from the point 35 by wire 36 and from the point 37 by wire 38. The resistance R' is connected by wires 39 and 40 to points 41 and 42 on wires 36 and 38. The field D of dynamo C is connected by wires 43 and 44 to the arms P and P', respectively. When the arms P and P' each bear upon the central segments of the series T and T', there will be no difference of potential between them, because the voltage drop through the resistance R is equal to that through resistance R', and there will be no difference of potential between the middle portions of the series of contacts T and T'. It is obvious that in intermediate positions, in which the arms bear upon the segments between the middle portions and the end segments, there will be various values of electromotive force between the arms in one direction or the other, by means of which construction and operation the excitation of the field D, and consequently the voltage of the armature of the auxiliary dynamo C, will vary in position and amount with the movement of the arms P and P', respectively, to the angular segments S.

When the apparatus is in the position shown in Fig. 1, in which both arms P and P' make contact with the inner segments of the series T and T', it will be seen that the arm P is at the same potential as the positive side of the system, and the arm P' will have the potential of the negative side. There will therefore be between these two arms the full voltage of the source of exciting-current for the field D, the current passing from the point 35 by wire 36 to arm P, thence by wire 43 to and through the field D, back by wire 42 to arm P', thence by wires 40 and 38 to the point 37 on the negative side of the system. When the lever G is tilted and the position of the arms P and P' is reversed, the full line potential will be impressed upon the field D, but in the opposite direction. When both arms P and P' make contact with the outer segments of the series T and T', it will be seen that the arm P will be at the potential of the negative side of the system, while arm P' will be at the potential of the positive side. Therefore current will flow from the point 35 on the positive side of the system by wires 36 and 39 to arm P', thence by wire 44 through field D and back by wire 43 to arm P, and thence by wire 38 to the point 37 on the negative side of the system, thereby reversing the current in the field D. It is obvious, therefore, that the booster-field D may be varied in strength from zero to a maximum in either direction and that any desired number of intermediate field strengths may be obtained by varying the resistances R and R' inversely to each other.

In Fig. 3 the series of contact-segments T² and T³ are made flat, and curved conducting-arms P² and P³, as shown, are adapted to roll upon the segments, thereby forming a rolling contact between the arms and the segments, which moves along the length of the segments from one end to the other. In this manner the resistances R and R' are varied. Any suitable means may be provided connected to operate the rolling arms P² and P³. Suitable means are shown in Fig. 3, which in this instance consist of the T-shaped lever $i$, connected to the arm K of core O of magnet M at one end and provided with a retracting-spring L at the other end. The lever $i$ is pivoted at H to a support I and is provided with a downwardly-depending arm $j$, to which a rod $k$ is pivoted at one end. To the other end of the rod $k$ is pivoted the curved arm P², also a rod $l$. To this latter rod $l$ is pivoted the curved arm P³. The circuits and connections of Fig. 3 are substantially like those of Fig. 1, so that the description of the operation of Fig. 1 applies to Fig. 3. As the energization of magnet M varies it will be seen that the rolling arms P² and P³ will be rocked and the point of contact between said arms and the segments T² and T³ will travel from one end of the segments to the other, according to the movements of the core O of the magnet M. Both arms P² and P³ make contact at the left-hand ends of segments T² and T³ at the same time or at the left-hand ends at the same time.

With the parts in the position shown in Fig. 3 the contact-arm P³ will be at the potential of the positive side of the system and contact-arm P² will be at the potential of the negative side. Current will therefore flow from the point 35 by wires 36 and 39 to the arm P³, thence by wire 44 to and through the field D, back by wire 43 to arm P², thence by wire 38 to the point 37 on the negative side of the system. When the arms P² and P³ are rolled along the contacts until they make contact with the segments at the right-hand ends of the series, it will then be seen that contact-arm P² will be at the potential of the positive side of the system and arm P³ will be at that of the negative side. Then current will flow from the point 35 by wire 36 to arm P², thence by wire 43 through field D, back by wire 44 to arm P³, thence by wires 40 and 38 to the negative side of the system to the point 37. When the contact-arms P² and P³ rest at the middle portions of the series of segments T² and T³, there will then be no difference of potential between said arms, and there will be no current in the field D. The current in the field D is thus varied in direction and amount, according to the needs of the system.

Although the series of contact-segments T² T³ are shown flat in Fig. 3 they may be either flat or curved, the only limitation being that the curvature of the surface of the segments should differ materially from that of the rolling arms.

Obviously some features of this invention may be used without others, and the invention may be embodied in widely-varying forms.

Therefore, without limiting the invention to the constructions shown and described nor enumerating equivalents, I claim, and desire to obtain by Letters Patent, the following:

1. The combination of a plurality of series of contact-segments, a resistance connected thereto, a centrally-pivoted contact-arm extending at an angle across the edges of the segments, and electroresponsive means for moving said arm about the pivot in the plane of the edges of the segments to contact with the edges of the segments successively.

2. The combination of a plurality of series of contact-segments, a resistance connected thereto, a centrally-pivoted contact-arm arranged opposite the edges of the segments and at an angle to the direction of extent of the segments, whereby the arm when moved about the pivot in the plane of the edges of the segments is adapted to contact with the edges of the segments successively, and electroresponsive means for actuating said arm.

3. The combination of a plurality of series of contact-segments, a resistance connected thereto, a centrally-pivoted contact-arm arranged at an angle across the edges of the segments and adapted to make contact therewith, and electroresponsive means for moving said arm transversely to its length about the pivot in the plane of the edges of the segments, whereby different points on the arm contact successively with the edges of the segments.

4. The combination of a series of contact-segments, a resistance connected thereto, a pivoted contact-arm arranged opposite the edges of the segments and at an angle to the direction of extent of the segments, whereby the arm when moved on its pivot in the plane of the edges of the segments is adapted to contact with the edges of the segments successively, and electroresponsive means for actuating said arm about its pivot.

5. The combination of a series of contact-segments, a resistance connected thereto, a pivoted contact-arm extending at an angle across the edges of the segments, and electroresponsive means for moving said arm about its pivot in the plane of the edges of the segments to contact with the segments successively.

6. The combination of a series of contact-segments, a resistance connected thereto, a pivoted contact-arm arranged at an angle across the edges of the segments and adapted to make contact therewith, and electroresponsive means for moving said arm about its pivot in the plane of the edges of the segments, whereby different points on the arm contact successively with the edges of the segments.

7. In a regulator, the combination of a plurality of series of contact-segments, contact-blades extending at an angle across the edges of said segments, and bodily movable respectively in the planes of the edges of the segments, a pivoted arm connecting said blades, and means for actuating said arm.

8. In a regulator, the combination of a series of contact-segments, a contact-blade extending at an angle to the direction of extent of the edges or ends of the segments and adapted to be moved bodily in a plane including the edges of the segments, whereby different points on the blade contact successively with the edges of the segments, and means for actuating said arm.

9. In a regulator, the combination of a plurality of series of contact-segments, contact-blades extending at an angle across the edges of said segments, and bodily movable respectively in the planes of the edges of the segments, a pivoted arm connecting said blades, and electroresponsive means for actuating said arm.

In testimony whereof I have signed this specification in the presence of two subscribing witnesses.

JOSEPH BIJUR.

Witnesses:
  E. VAN ZANDT,
  H. L. OBERTEUFFER.